United States Patent Office 2,912,716
Patented Nov. 17, 1959

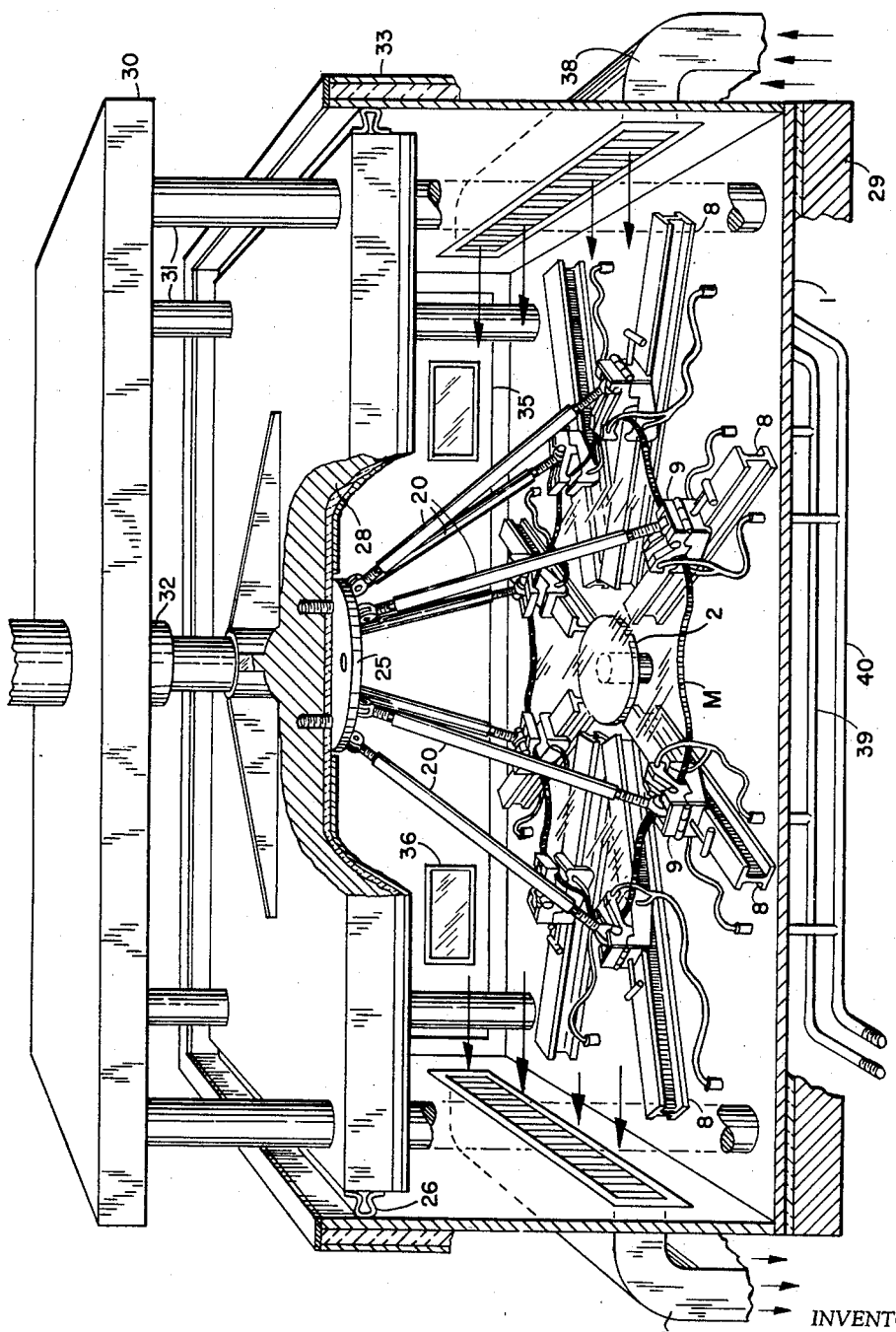
INVENTORS.
CHARLES R. FROWNFELTER
ROBERT J. HARRY
RICHARD S. HASSARD
DUANE C. SHEARER
ATTORNEY

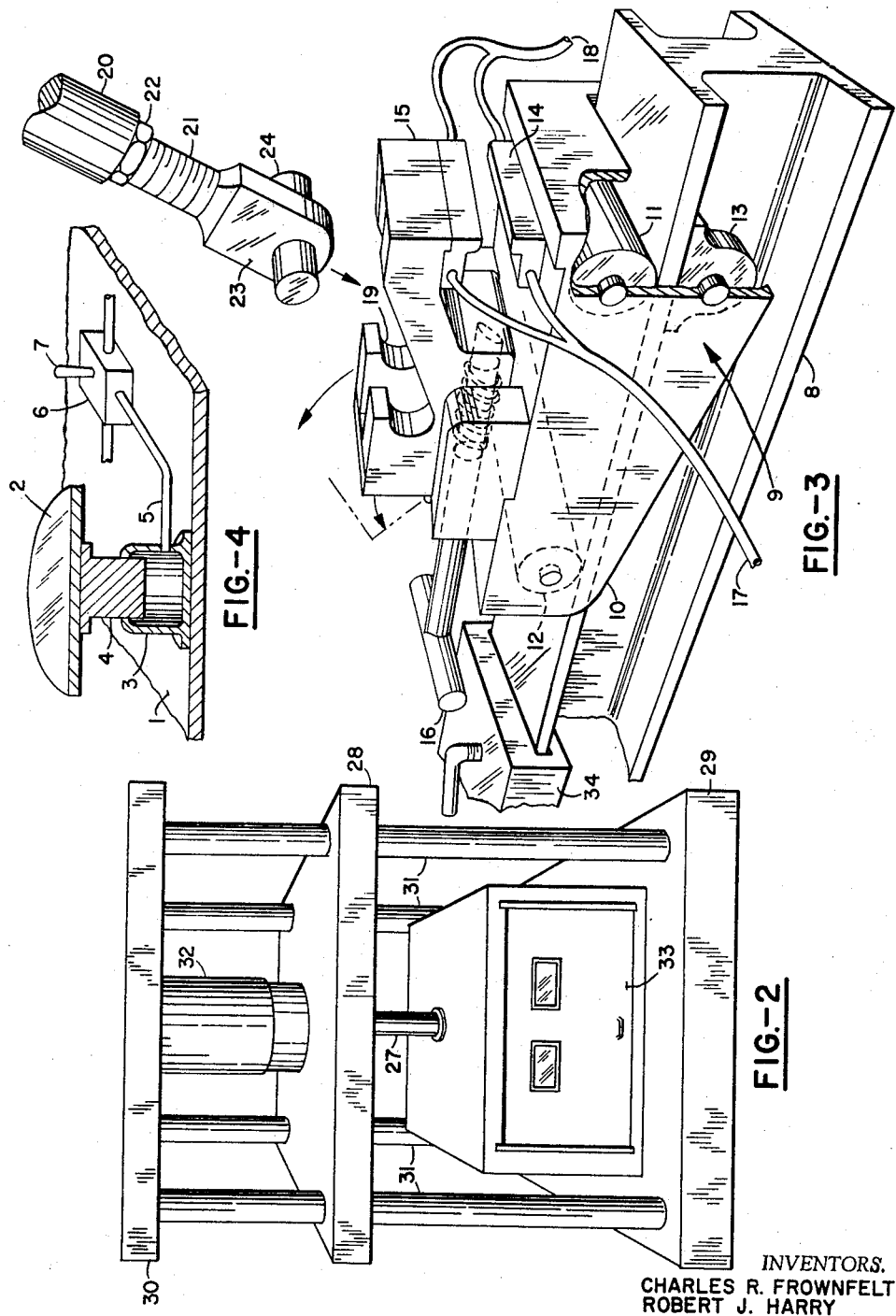

2,912,716
APPARATUS FOR STRETCHING PLASTIC SHEET MATERIAL

Charles R. Frownfelter, Pittsburgh, Pa., and Robert J. Harry, Cincinnati, Richard S. Hassard, Cuyahoga Falls, and Duane C. Shearer, Tallmadge, Ohio, assignors to Goodyear Aircraft Corporation, Akron, Ohio, a corporation of Delaware Application September 3, 1958, Serial No. 758,803

6 Claims. (Cl. 18—1)

This invention relates to apparatus for stretching plastic sheet material on a plurality of axes, and, more particularly, is concerned with stretching flat transparent sheet material, such as polymethyl methacrylate, to improve the physical characteristics of sheet material of this type used to make airplane canopies and the like.

It has been found that the shatter resistance of an airplane canopy made of transparent plastic material of the type described is noticeably improved if the sheet material prior to being formed into a canopy is stretched, for example, between 50% and 150% in both lateral and longitudinal directions. However, apparatus provided heretofore to perform such stretching operations has been open to various objections. For example, known apparatus has stretched the plastic sheet material both longitudinally and laterally by stretching means which grip the ends and the sides of the sheet in relatively straight lines which tend to give stress concentrations at the corners of the sheet which are objectionable. Also, known apparatus has tended to be of relatively complicated and expensive type requiring special built-in power mechanisms.

It is the general object of the present invention to avoid and overcome the foregoing and other difficulties of and objections to prior art apparatus by the provision of a relatively simple and inexpensive apparatus for stretching plastic sheet material, which apparatus can be employed with a conventional hydraulic press which supplies the power to operate the apparatus.

Another object of the invention is the provision of apparatus to simultaneously stretch the sheet by a plurality of radially movable means gripping the periphery of the sheet; whereby in the central portion of the sheet stress concentrations are avoided.

Another object of the invention is the provision of plastic sheet stretching apparatus in which relatively simple temperature control mechanisms are utilized before, during and after stretching of the sheet.

The foregoing objects of the invention, and other objects which will become apparent as the description proceeds, are achieved by the provision of apparatus including a base adapted to be positioned on the bed of a hydraulic press, a plurality of rails on the base radiating outwardly from the center of the base, a clamp slidably mounted on each rail and having jaws adapted to grip the edge of the sheet material, flexible conduit means for circulating cooling fluid through the jaws, means positioned in alignment with the center from which the rails radiate and adapted to be engaged with the movable platen of a hydraulic press, a plurality of rods equal in number to the number of clamps, each rod being pivotally secured between the means and a clamp and extending radially out from the means, means for individually adjusting the length of each rod, a hood around the apparatus and mounted on the base, input and output air ducts for circulating air at a controlled temperature through the inside of the hood, and doors on the hood to allow access to the inside of the hood.

For a better understanding of the invention reference should be had to the accompanying drawings wherein Fig. 1 is a vertical sectional view shown in perspective, of a typical embodiment of the apparatus of the invention, associated with a hydraulic press, the front of the hood of the apparatus being cut away;

Fig. 2 is a front perspective view of the apparatus of the invention incorporated in another manner with a hydraulic press;

Fig. 3 is an enlarged fragmentary perspective view of one of the rails and slidably mounted clamps of the apparatus; and Fig. 4 is an enlarged fragmentary view of the mechanism for raising and lowering the stand at the center of the apparatus.

In the drawings, the numeral 1 indicates a flat metal base at the center of which is positioned a stand 2 which is preferably made vertically adjustable as to height, as shown, for example, in Fig. 4. A hydraulic cylinder 3 mounted on the base 1 slidably receives for vertical movement a piston 4 secured to stand 2. A conduit 5 supplies fluid to and from the cylinder under control of valve 6 operated by handle 7 so that movement of the handle 7 will raise the stand 2 to support position or lower it out of the way.

Extending radially from the stand 2, but with their inner ends spaced therefrom, are a plurality of rails 8 secured to the base 1, with each rail mounting a clamp 9. As best seen in Fig. 3, each clamp 9 includes an inverted U-shaped frame 10 rotatably supporting a pair of rollers 11 and 12 which ride upon the top of the rail 8, and a pair of friction-bearing shoes 13 engaging with the underside of the flanged top of the rail 8 and each pivotally supported by the frame 10. A fixed jaw member 14 is mounted on the top of the inner end of the frame 10 and cooperating therewith is a movable jaw member 15 pivotally secured to the frame 10 and adapted to be locked in gripping position with the jaw 14 by a spring-loaded jaw latch 16. For the purpose of circulating cooling fluid through the jaws flexible input conduits 17 are secured to the jaws 14 and 15, as are flexible output conduits 18.

The top of each clamp 9 is provided with a recess 19 adapted to pivotally and removably receive the end of a push rod 20 which is made adjustable in length. For example, the end of the rod 20 can be formed with a threaded bore adjustably receiving the threaded shank 21 and locked in position by a nut 22, the threaded shank terminating in a head 23 through which extends a pressed-in pin 24 which is pivotally received in the recesses 19.

The upper ends of the rods 20 are pivotally secured to a plate means 25 which has a plurality of holes therein for facilitating the securing of the plate to the underside of a hydraulic press platen, such as the platen 28 of a press including a bed 29 and a head 30 connected by the rods 31, and having a hydraulic cylinder 32 for moving platen 28.

Surrounding the apparatus as described and mounted on the base 1 is a hood 33 including side and ends. A door 35 is provided at the front and back of the hood 33, observation windows 36 being present, for example, in the doors, and the doors are mounted for vertical sliding movement so as to permit access to the inside of the hood. A gasket 26 surrounding the platen 28 slidably seals with the ends and sides of the hood 33. An exhaust duct 37 is connected to one end of the hood and an inlet duct 38 to the other end, the ducts being connected to controlled temperature air for controlling the temperature inside the hood 33.

The conduits 17 and 18 extending to the jaws 14 and 15 are connected to header conduits 39 and 40 so that controlled temperature liquid can be supplied to all jaws simultaneously.

In the operation of the apparatus as described, the interior of the apparatus is heated by the passage of hot air from duct 38 through the hood 33 and out duct 37. At the same time a piece of plastic sheet material is heated in an oven to substantially the temperature at which it can be stretched. The sheet material is preferably of configuration permitting proper clamping orientation, and may be of substantially circular or oval form, or that of an irregular polygon. Now with the stand 2 raised to the position where the top of the stand is substantially in horizontal alignment with the opening of the jaws 14 and 15, the door 35 on one side of the hood is opened, the hot air from duct 38 is shut off, and the piece of sheet material is positioned with its center on the stand 2; the rods 20 being released from their clamps and swung out of position to allow the sheet material to be moved into the position shown substantially in Fig. 1, the material being indicated by the letter M.

Now each one of the clamps 9 is brought into positon adjacent the periphery of the sheet M and the jaws 15 of each clamp are pressed down into gripping relation with the periphery of the sheet M and so that the jaw latches 16 snap into locking position. If it is necessary for any reason to adjust the length of any particular rod 20 to properly position its associated clamp, this can be readily accomplished.

In order to assist in pressing the jaws 14 and 15 of each clamp 9 together so that the latches 16 snap into locking position a releasable stop 34 (see Fig. 3) may be adjustably secured to each rail 8. In actual operation the stops 34 are moved into engagement with their respective clamps and are locked to the rail 8 by the releasable lock screw shown. Then the platen 28 is moved downwardly a short distance to press the jaws 14 and 15 together and into the sheet M a sufficient distance to allow latcher 16 to snap into lock position. Then stops 34 are released and moved out of the way. Cooling liquid is now circulated through each of the sets of the jaws 14 and 15, the stand 2 is lowered away from the center of the sheet by throwing handle 7 in the opposite direction, the door 35 of the hood 33 is closed and hot air is again circulated through the hood to bring the temperature of the sheet M back up to the temperature at which it can be stretched. This re-heating of the sheet is generally advisable inasmuch as the sheet M loses some of its temperature during the time consumed in securing the clamps to the periphery of the sheet.

Once the sheet is at forming temperature the platen 28 of the hydraulic press is lowered by the hydraulic ram 32 to press plate 25 downwardly. Such downward movement operates through rods 20 to move each clamp 9 radially outwardly on its supporting rail 8 to effect the simultaneous stretching of the sheet material M in the plurality of radial directions illustrated and effects an overall and uniform stretching of the material M up to 50% and often 100% or more. The stretched sheet while still clamped and held is then cooled by passing cooling air from duct 38 through the hood 33 and out the exhaust duct 37. During the cooling period, the platen 28 of the hydraulic press is preferably raised slightly in order to confirm the stress present in the material due to thermal contraction to a value below the proportional limit of the material. Upon completion of the cooling period, the door 35 of the hood is opened, each of the clamps 9 is released from the periphery of the sheet by operation of latches 16, the clamps are moved out of the way and radially off the periphery of the sheet, this being easily accomplished by pin 24 releasing from recesses 19 of each clamp, and with the rods 20 swung out of the way, the plastic sheet, stretched and cooled, can be removed through one of the doors of the hood 33. Raising the platen 28 of the hydraulic press will then reposition the apparatus for operating upon a second sheet of material M.

The embodiment of the invention of Fig. 2 is similar to that already described, and the same numerals have been used to indicate like parts. The only difference is that the hood 33 of the embodiment of Fig. 2 is positioned within the confines of the tire rods 31, the hood is provided with a top, and a shaft 27 extends slidably through the top of the hood to connect the platen 28 and the plate 25. The operation of the form of the invention of Fig. 2 is the same as that previously described.

As illustrated in the drawings, thermal insulation is preferably incorporated with the base 29 movable platen 28 and the hood 33.

While a certain representative embodiment and details have been shown for the purpose of illustrating the invention, it will be apparent to those skilled in this art that various changes and modifications may be made therein without departing from the spirit or scope of the invention.

What is claimed is:

1. Apparatus for stretching transparent plastic sheet material including a base adapted to be positioned on the bed of a hydraulic press, a stand positioned centrally of the base and upstanding therefrom, means for reducing the height of the stand, a plurality of rails on the base radiating outwardly from the stand, the upper surface of the rails being below the surface of the stand in its upstanding position, a clamp slidably mounted on each rail and having jaws adapted to grip the edge of the sheet material, flexible conduit means for circulating cooling fluid through the jaws, a plate positioned in alignment with the stand and adapted to be engaged with the movable platen of a hydraulic press, a plurality of rods equal in number to the number of clamps, each rod being pivotally secured between the plate and a clamp and extending radially out from the plate, means for individually adjusting the length of each rod, a hood around the apparatus and mounted on the base, input and output air ducts for circulating air at a controlled temperature through the inside of the hood, doors on the hood to allow access to the inside of the hood, said hood being adapted to have sliding and sealing means with the movable platen of a hydraulic press.

2. Apparatus for stretching transparent plastic sheet material including a base adapted to be positioned on the bed of a hydraulic press, a plurality of rails on the base radiating outwardly from the center of the base, a clamp slidably mounted on each rail and having jaws adapted to grip the edge of the sheet material, flexible conduit means for circulating cooling fluid through the jaws, means adapted to be engaged with the movable platen of a hydraulic press, a plurality of rods equal in number to the number of clamps, each rod being pivotally secured between the last-named means and a clamp and extending radially out from the said last-named means, means for individually adjusting the length of each rod, a hood around the apparatus and mounted on the base, input and output air ducts for circulating air at a controlled temperature through the inside of the hood, and doors on the hood to allow access to the inside of the hood.

3. Apparatus for stretching transparent plastic sheet material including a base, a plurality of rails on the base radiating outwardly at equal angles from a common center, a clamp slidably mounted on each rail and having jaws adapted to grip the edge of the sheet material, adjustably positioned stop means on the rails, a plate adapted to be engaged with a prime mover, a plurality of rods equal in number to the number of clamps, each rod being pivotally secured between the plate and a clamp and extending radially out from the plate, means for individually adjusting the length of each rod, a hood around the apparatus and mounted on the base, input and output air ducts for circulating air at a controlled temperature through the inside of the hood, and doors on the hood to allow access to the inside of the hood.

4. Apparatus for stretching transparent plastic sheet material including a stationary base, a plurality of rails on the base radiating outwardly from substantially the center of the base, a clamp slidably mounted on each rail and having jaws adapted to grip the edge of the sheet material, means adapted to be engaged with a prime mover, a plurality of rods equal in number to the number of clamps, each rod being pivotally secured between the means and a clamp and extending radially out from the means, means for individually adjusting the length of each rod, and a hood around the apparatus and mounted on the base.

5. The combination in apparatus for stretch forming plastic sheet of a hydraulic press having a stationary and a movable platen, a plurality of gripping means for gripping a plastic sheet at spaced points around its periphery, means slidably mounting the gripping means in association with one platen for movement outwardly of the sheet, a plate carried by the other platen and relatively movable toward and from the approximate center of the sheet in a direction vertical thereto, adjustable length links pivotally connecting each gripping means to the plate, and an open top hood surrounding the gripping means and mounted on the stationary platen, and a gasket around the periphery of movable platen and slidably engaging in sealing relation with the inside of the hood.

6. The combination in apparatus for stretch forming plastic sheet of a hydraulic press having a stationary and a movable platen, a plurality of gripping means for gripping a plastic sheet at spaced points around its periphery, means slidably mounting the gripping means in association with one platen for movement outwardly of the sheet, means carried by the other platen and relatively movable toward the sheet in a direction vertical thereto, and links pivotally connecting each gripping means to the said last-named means.

References Cited in the file of this patent
UNITED STATES PATENTS
2,759,217    Peterson _____ Aug. 21, 1956